United States Patent [19]
Takamatsu et al.

[11] Patent Number: 6,092,552
[45] Date of Patent: Jul. 25, 2000

[54] DIAPHRAGM AND ACCUMULATOR USING THE SAME

[75] Inventors: Shigeaki Takamatsu; Hiroaki Nagaoka, both of Aichi, Japan

[73] Assignee: Tokai Rubber Industries, Ltd., Komaki, Japan

[21] Appl. No.: 09/220,352

[22] Filed: Dec. 24, 1998

[30] Foreign Application Priority Data

Dec. 25, 1997 [JP] Japan .................................. 9-358123

[51] Int. Cl.⁷ .................................................. F16L 55/04
[52] U.S. Cl. ............................................. 138/30; 138/31
[58] Field of Search ........................................ 138/30, 31

[56] References Cited

U.S. PATENT DOCUMENTS

| | | | |
|---|---|---|---|
| 2,360,590 | 10/1944 | Schweller | 138/30 |
| 2,924,359 | 2/1960 | Beremand | 138/30 |
| 4,684,687 | 8/1987 | Breach et al. . | |
| 4,777,982 | 10/1988 | Borowitz et al. | 138/30 |
| 5,117,873 | 6/1992 | Miyakawa et al. | 138/30 |
| 5,215,124 | 6/1993 | Hattori et al. | 138/30 |
| 5,409,041 | 4/1995 | Yoshida et al. | 138/30 |
| 5,524,671 | 6/1996 | Yoshida et al. | 138/30 |
| 5,618,629 | 4/1997 | Takamatsu et al. | 138/30 |
| 5,645,922 | 7/1997 | Le Rossignol | 138/30 |
| 5,653,263 | 8/1997 | Killing . | |
| 5,655,569 | 8/1997 | Tackett | 138/30 |

FOREIGN PATENT DOCUMENTS

| | | |
|---|---|---|
| 0 607 085 | 7/1994 | European Pat. Off. . |
| 0 682 060 | 11/1995 | European Pat. Off. . |
| 0 858 883 | 8/1998 | European Pat. Off. . |
| 2 662 638 | 12/1991 | France . |
| 2 685 740 | 7/1993 | France . |

OTHER PUBLICATIONS

JP 05 318684, Patent Abstracts of Japan, vol. 018, No. 133 (M–1571), Mar. 4, 1994.
JP 08 014202, Patent Abstracts of Japan, vol. 096, No. 005, May 31, 1996.
JP 09 111064, Patent Abstracts of Japan, vol. 097, No. 008, Aug. 29, 1997.

*Primary Examiner*—James F. Hook
*Attorney, Agent, or Firm*—Armstrong, Westerman, Hattori, McLeland & Naughton

[57] ABSTRACT

A diaphragm comprising a resin layer for gas shielding, a rubber layer adapted to be adjacent to a gas chamber of an accumulator, and a rubber layer adapted to be adjacent to an oil chamber of an accumulator, the rubber layers formed on opposite sides of the resin layer. The rubber layer adapted to be adjacent to the gas chamber is formed of a mixture of butyl rubber and ethylene-propylene-diene terpolymer. Also provided is an accumulator including the above diaphragm.

4 Claims, 4 Drawing Sheets

DIAPHRAGM AND ACCUMULATOR USING THE SAME

BACKGROUND OF THE INVENTION

1. Field of the Invention

The present invention relates to a diaphragm and an accumulator containing the same which is used for hydraulic systems and the like of automobile vehicles, industrial vehicles and the like.

2. Description of the Prior Art

An accumulator has a pressure accumulating function and generally comprises a metallic shell and a diaphragm installed within the shell for separating the internal space of the shell into two chambers (a gas chamber and an oil chamber) The accumulator contains a gas such as nitrogen sealed in the gas chamber and also includes communication of the oil chamber with a hydraulic circuit of the hydraulic system via a circulation hole. When pressure in the oil chamber becomes larger than that of the gas chamber by hydraulic oil flowing into the oil chamber via the circulation hole, the diaphragm elastically deforms so that the gas within the gas chamber is compressed and the volume of the gas chamber become smaller. On the other hand, when the oil chamber is enlarged, pressure is accumulated in the hydraulic oil. The diaphragm generally comprises a resin layer for gas shielding, a rubber layer adjacent to the gas chamber formed on the resin layer, and a rubber layer adjacent to the oil chamber formed on the resin layer, wherein these two rubber layers sandwich the resin layer. As a material for forming both of the rubber layers adjacent to the gas chamber and the oil chamber, butyl rubber is used.

However, if a diaphragm having the above construction is subjected to an operating durability (test) at a temperature of not more than room temperature and under high operating pressure, the rubber is repetitively compressed and strained by elastic deformation. Thus, the rubber is rubbed and worn, resulting in cracking on the rubber layers and deterioration in durability for the diaphragm. Therefore, there is a problem such that service life of an accumulator using such a diaphragm is shortened.

In view of the foregoing, it is an object of the present invention to provide a diaphragm having good operativity both at a low temperature and room temperature and also having superior durability, and further to provide an accumulator using the same.

SUMMARY OF THE INVENTION

To accomplish the above object, in accordance with a first aspect of the present invention, there is provided a diaphragm comprising:
  a resin layer for gas shielding;
  a rubber layer adapted to be adjacent to a gas chamber, and a rubber layer adapted to be adjacent to an oil chamber, the rubber layers formed on opposites sides of the resin layer;
  wherein the rubber layer adapted to be adjacent to the gas chamber is formed of a mixture of butyl rubber and ethylene-propylene-diene terpolymer.

In this specification the term "butyl rubber" is used as a generic word, and includes halogenated rubbers such as chlorobutyl rubber or bromobutyl rubber.

In accordance with a second aspect of the present invention, there is provided an accumulator comprising:
  a shell; and
  a diaphragm which separates an internal space of the shell into a gas chamber and an oil chamber;
  wherein the diaphragm comprises:
    a resin layer for gas shielding;
    a rubber layer adjacent to a gas chamber and a rubber layer to an oil chamber, the rubber layers formed on opposite sides of the resin layer;
    wherein the rubber layer adjacent to the gas chamber is formed of a mixture of butyl rubber and ethylene-propylene-diene terpolymer.

Due to a series of research on the durability of the rubber layers of a diaphragm, the inventors of the present invention reached the conclusion that the rubber layer adjacent to the gas chamber is likely to be worn and cause cracking than one adjacent to the oil chamber. Upon further research on materials of the rubber layer adjacent to the gas chamber, the inventors found out that operativity of the diaphragm both at a low temperature and room temperature, was improved using a rubber material containing ethylene-propylene-diene terpolymer and butyl rubber for forming the rubber layer adjacent to a gas chamber, compared with the case of using butyl rubber solely for the same layer, so that the object can be achieved. Thus, the inventors-attained the present invention.

Further, when a plurality of grooves, each having a concave cross section and extending in the circumferential direction, are formed on a surface of the rubber layer adjacent to the gas chamber, the durability of the rubber layer adjacent to the gas chamber can further be improved.

DETAILED DESCRIPTION OF THE PREFERRED EMBODIMENTS

The present invention will hereinafter be described by way of embodiments thereof.

Figure 1:
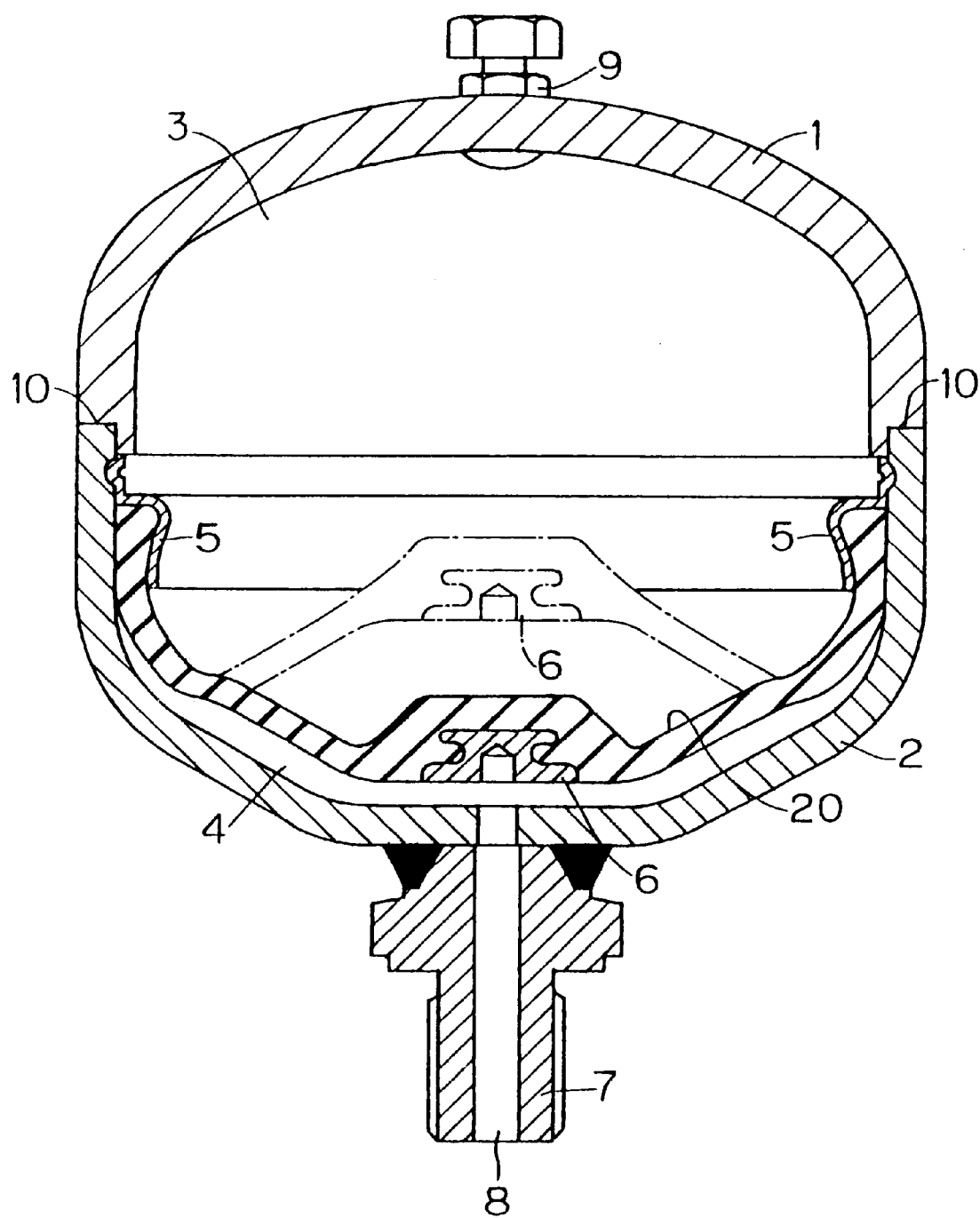
FIG. 1 is a sectional view illustrating one embodiment of an accumulator according to the present invention.

FIG. 1 is a view illustrating one embodiment of an accumulator according to the present invention. The accumulator comprises a pair of split-shells 1,2 and a diaphragm 20 for separating an internal space of the split-shells 1,2 into a gas chamber 3 and an oil chamber 4. In the figure, 5 is a ring holder, 6 is a poppet, 7 is a plug having an oil port 8, 9 is a gas plug, 10 is a portion of the split-shells welded by an electron beam. In the figure, the dashed line illustrates the position of the diaphragm when elastically deformed.

The material of the split-shells 1,2 is not critical as long as it is metallic. For example, a shell formed by iron, alluminium alloy and the like preferably may be used.

The diaphragm 20 comprises a resin layer 21 for gas shielding and a rubber layer 22 adjacent to the gas chamber 3 and a rubber layer 23 adjacent to the oil chamber 4, wherein the rubber layers 22, 23 are integrally unified to opposite sides of the resin layer 21.

The resin layer 21 prevents gas sealed within the gas chamber 3 from permeating through the diaphragm. The material for the resin layer 21 is not critical as long as its gas permeability is low. Examples of such a material include ethylene-vinyl alcohol copolymer (EVOH), polyamide resin, polyvinylidene fluoride, polyvinylidene chloride, polyphenylene.sulfide, liquid crystal polymer and polyethylene naphthalate. These materials may be used either alone or in combinations thereof. The resin layer 21 may have a single-layer structure or a multi-layer structure of two or more layers.

As for the above EVOH, there is no specific limitation. However, it is preferable to employ an EVOR material wherein ethylene is present in an amount of 20 to 65% by weight (just abbreviated to %, hereinafter) and wherein vinyl alcohol is present in an amount of the remaining %. Among all, the EVOH material wherein. ethylene is present in an amount of 32% is preferably suitable.

Examples of the above polyamide resin include nylon 6, nylon 66, nylon 6-10 and nylon 6-12. These resins are employed either solely or in combinations thereof. If such polyamide resin contains nylon 6 or nylon 66 as a base, its melting point becomes near to that of the EVOH. Therefore, it is possible to employ various mixtures of nylon 6 or nylon 66 and another polyamide resin. Especially, it is preferable to employ a mixture of the above polyamide resin and a polyolefin resin. Since a polyolefin resin has a poor water absorbability in such a mixture, it prevents water absorption by the EVOH. That is, if the EVOH absorbs water, its gas barrier property deteriorates, which can be prevented by the inclusion of a polyolefine resin.

As a material for forming the rubber layer 22 adjacent to the gas chamber 3, a mixture of butyl rubber and ethylene propylene-diene terpolymer (just abbreviated to EPDM hereinafter) may be used.

Examples of the butyl rubber contained in rubber layer include butyl rubber (IIR), chlorobutyl rubber (Cl-IIR) and bromobutyl rubber (Br-IIR). These rubbers are employed either solely or in combinations of two or more. Among all, it is preferable to employ chlorobutyl rubber (Cl-IIR) in consideration of superior conpression set.

Examples of the third component (i.e., the diene component) of the EPDM include ethylidene norbornene, dicyclopentadiene and 1,4-hexadiene.

The ethylene content in the EPDM is preferably within a range of 50 to 70%, more preferably, 50 to 60%. That is, when the content is less than 50%, the tensile strength of raw rubber decreases. On the other hand, when the content is over 70%, the operativity at a low temperature deteriorates. Further, the content of the third component (the diene component) in the EPDM is preferably about 5% and the remaining % is the content of propylene. It is preferable that an iodine value of the EPDH is within a range of 10 to 24, more preferably, 12 to 17. That is, when the iodine value is less than 10, the vulcanization speed becomes slow, while when it is over 24, the heat resistance is deteriorated.

The mixing ratio of the butyl rubber to the EPDM is preferably butyl rubber/EPDM=90/10 to 60/40, more preferably butyl rubber/EPDM=85/15 to 70/30. That is, when the EPDM is less than 10 (or the butyl rubber is over 90), the bending fatigue property of the rubber is insufficient, while when the EPDM is over 40 (or the butyl rubber is less than 60), the gas permeation resistance deteriorates.

In addition to the butyl rubber and the EPDM compounds, a filler may be added into the material for forming the rubber layer 22 adjacent to the gas chamber 3. There is no limitation for such a filler. For example, carbon black may be exemplified. The content of the filler is preferably such that hardness of the rubber material is in the range of 60 to 80 (in accordance with JIS A). That is, when the hardness (JIS A) is less than 60, the reinforcing effect for the resin layer 21 of the diaphragm 20 is insufficient so that the rubber layer 22 adjacent to the gas chamber 3 itself may not deform smoothly when the diaphragm 20 deforms. If the hardness (JIS A) is over 80, the elongation at break of the rubber material itself decreases.

The materials for forming the rubber layer 23 adjacent to the oil chamber 4 are not critical and conventional rubbers may be used Examples thereof include butyl rubber, natural rubber, epichlorohydrin rubber, acrylonitrile butadiene rubber (NBR) and hydrogenated acrylonitrile butadiene rubber (H-NBR). These materials are employed either solely or in combinations of two or more. In the present invention, the material for forming the rubber layer 23 adjacent to the oil chamber 4 may be the same as that of the rubber layer 22 adjacent to the gas chamber 3.

In addition to the rubber materials, an additive such as a vulcanizing agent, a vulcanization accelerator, an antioxidant, a softener and a plasticizer may appropriately be added to the material for forming the rubber layer 22 adjacent to the gas chamber 3 and the rubber layer 23 adjacent to the oil chamber 4.

Figure 2:
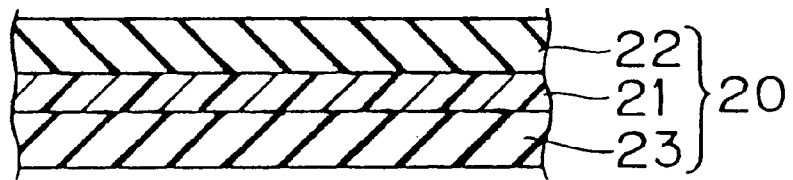
FIG. 2 is an enlarged sectional view of the essential portion for illustrating the construction of one embodiment of a diaphragm according to the present invention.

The diaphragm 20 of the present invention may be produced, for example, in the following manner. That is, the resin layer (or a resin film) 21 for shielding gas is produced by using a resin film having low gas permeability such as EVOH or polyamide resin, or laminating two or more thereof. Secondly, a conventional adhesive is applied on both sides of the resin layer (or the resin film) 21 and the material for forming the rubber layer 22 adjacent to the gas chamber 3 and the material for forming the rubber layer 23 adjacent to the oil chamber 4 are press-formed by a presser and cured so as to be adhered to the resin layer. Thus, the diaphragm 20 having a layered structure as shown in FIG. 2 is obtained.

The resin layer 21 of thus obtained diaphragm 20 of the present invention is usually 10 to 210 $\mu$m in thickness. The rubber layer 22 adjacent to the gas chamber 3 is usually 1 to 4 mm, preferably 1.5 to 3 mm. The rubber layer 23 adjacent to the oil chamber 4 is usually 1 to 4 mm, preferably 1.5 to 3 mm.

The accumulator of the present invention may be produced using the thus obtained diaphragm 20, for example, in the following manner. First, a peripheral edge of the diaphragm 20 is positioned at an edge of an inner circumference of the opening of the lower split-shell 2, one of a pair of split-shells 1, 2, each shaped into a generally hemispherical shape, and fixed by being pinched between a periphery of the ring holder 5 and the edge of the inner circumference of the opening of the lower split-shell 2 so as to be installed on the lower split-shell 2. Next, the opening of an upper split-shell 1, the other of a pair of split-shells, is engaged onto the opening of the lower split-shell 2 and welded by electron beam or the like. Thus, the accumulator shown in FIG. 1 can be produced.

In the present invention, a plurality of grooves 24, each having a concave cross section and extending in the circumferential direction, may be formed at certain intervals on the diaphragm so that ribs 25 may be formed on the surface of the rubber layer 22. For example, these grooves 24 in a circular diaphragm may be in the form of concentric rings which thereby form a "bulls-eye" appearance on the diaphragm. Since durability of the rubber layer 22 adjacent to the gas chamber 3 is improved by forming the grooves 24 having such a concave cross-section, the durability of both the diaphragm 20 and the accumulator using the same are further improved. In addition, the grooves 24 having the concave cross section includes grooves having a V-shaped cross section and the like.

The shape of the shell in the accumulator of the present invention is not limited to a generally spherical shell formed by engaging the pair of split-shells 1, 2, each having a generally hemispherical shape, and includes a cylinder, a box and the like.

Examples will next be described along with comparative Examples.

First, prior to preparation of the Examples and Comparative Examples, the ingredients shown in the following Tables 1 and 2 were mixed together in ratios shown in the same Tables so that rubber compositions 1 to 10 were prepared. The physical properties at ordinary conditions, low-temperature torsion, durability and compression set of each composition determined in the following manner are also shown in Tables 1 and 2.

Physical Properties at Ordinary Conditions

Tensile strength (MPa), elongation at break (%) and hardness (JIS A) were determined in accordance with a manner described in JIS K 6301.

Low-temperature Torsion

The low-temperature torsion test was carried out in accordance with a manner described in JIS K 6301 in order to evaluate the flexibility of each rubber composition at a low temperature.

Durability

The durability was evaluated in a flex cracking test in accordance with JIS K 6260. The number of bends were counted until each test piece (the rubber composition) had reached the 6th grade (a crack not less than 3.0 mm long). In addition, the number of bends was limited to 500,000 times and the grade at 500,000 times was mentioned when a test piece had not reached the 6th grade at 500,000 times.

Compression Set

Compression set was determined under conditions of 120° C.×70 hours in accordance with JIS K 6301.

TABLE 1

(Parts by weight)

| RUBBER COMPOSITION | 1 | 2 | 3 | 4 | 5 | 6 |
|---|---|---|---|---|---|---|
| C1-IIR *1 | 85 | 70 | 85 | 85 | — | — |
| IIR *2 | — | — | — | — | 85 | — |
| Br-IIR *3 | — | — | — | — | — | 85 |
| EPDM *4 | 15 | 30 | 15 | 15 | 15 | 15 |
| Carbon black (SRF) | 110 | 110 | 90 | 130 | 110 | 110 |
| Stearic acid | 1 | 1 | 1 | 1 | 1 | 1 |
| Oil (dioctyl sebacate) | 10 | 10 | 10 | 10 | 10 | 10 |
| Zinc oxide | 5 | 5 | 5 | 5 | 5 | 5 |
| Vulcanization accellerator (sulfenamide type accellerator) | 1 | 1 | 1 | 1 | 1 | 1 |
| Antioxidant (TMDQ) | 1 | 1 | 1 | 1 | 1 | 1 |
| Sulfur | — | — | — | — | 0.8 | — |
| Physical properties at ordinary conditions | | | | | | |
| tensile strength (MPa) | 10.6 | 9.8 | 10.7 | 10.7 | 9.5 | 10.8 |
| elongation at break (%) | 300 | 320 | 360 | 270 | 320 | 300 |
| Hardness (JIS A) | 70 | 70 | 60 | 75 | 69 | 70 |
| Low temperature torsion T5 (° C.) | −47.4 | −48.5 | −47.1 | −46.9 | −46 | −46.8 |
| Durability (flex cracking test) | 2nd grade *5 | 400,000 times | 2nd grade *5 | 140,000 times | 300,000 times | 450,000 times |
| Compression set (120° C. × 70 hours) | 45 | 49 | 44 | 46 | 85 | 49 |

Note:
*1 Chlorobutyl 1066 available from JSR Corporation.
*2: Butyl 268 available from JSR Corporation.
*3: Bromobutyl 2244 available from JSR Corporation.
*4: ESPRENE 532 available from Sumitomo Chemical Co., Ltd. (The content of ethylene: 51.1%, iodine value: 12)
*5: Whether a crack is slightly caused or not can be visually evaluated.

TABLE 2

(Parts by weight)

| RUBBER COMPOSITION | 7 | 8 | 9 | 10 |
|---|---|---|---|---|
| C1-IIR *1 | 100 | 85 | 85 | 55 |
| EPDM *2 | — | — | — | 45 |
| Natural rubber | — | 15 | — | — |
| BR *3 | — | — | 15 | — |
| Carbon black (SRF) | 110 | 110 | 110 | 110 |
| Stearic acid | 1 | 1 | 1 | 1 |
| Oil (dioctyl sebacate) | 10 | 10 | 10 | 10 |
| Zinc oxide | 5 | 5 | 5 | 5 |
| Vulcanization accelerator (sulfenamide type accelerator) | 1 | 1 | 1 | 1 |
| Antioxidant (TMDQ) | 1 | 1 | 1 | 1 |
| Physical properties at ordinary conditions | | | | |
| tensile strength (MPa) | 10.6 | 11.5 | 11.5 | 9.2 |
| elongation at break (%) | 270 | 300 | 260 | 300 |
| Hardness (JIS A) | 70 | 72 | 72 | 72 |
| Low temperature torsion T5 (° C.) | −44 | −47.2 | −44.8 | −48.8 |

TABLE 2-continued

| RUBBER COMPOSITION | 7 | 8 | 9 | 10 |
|---|---|---|---|---|
| Durability (flex cracking test) | 50,000 times | 140,000 times | 260,000 times | 2nd grade *4 |
| Compression set (120° C. × 70 hours) | 38 | 48 | 35 | 58 |

Note:
*1: Chlorobutyl 1066 available from JSR Corporation.
*2: ESPRENE 532 available from Sumitomo Chemical Co., Ltd. (The content of ethylene: 51.1%, iodine value: 12)
*3: UBEPOL-BR150 available from UBE Industries Ltd.
*4: Whether a crack is slightly caused or not can be visually evaluated.

From the results of Tables 1 and 2, since the rubber compositions 7 to 9 contain chlorobutyl rubber, but do not contain EPDM, the durability is inferior. On the other hand, since the rubber compositions 1 to 6 and 10 contain both chlorobutyl rubber and EPDM, the durability is excellent.

EXAMPLES 1 TO 11

Figure 3:
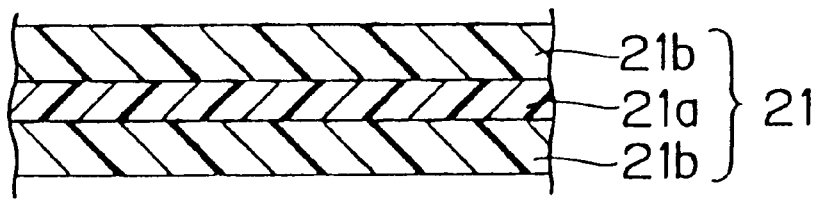
FIG. 3 is an enlarged sectional view of the essential portion for illustrating the construction of a resin layer of the diaphragm according to the present invention.
Figure 4:
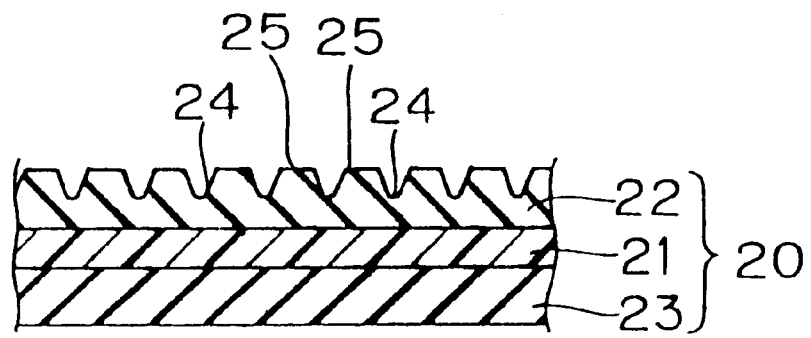
FIG. 4 is an enlarged sectional view of the essential portion for illustrating the construction of another embodiment of the diaphragm according to the present invention.

First, EVOH (F-101, available from Kuraray Co., Ltd.; the ethylene content: 32%) and polyamide resin (Super tough nylon ST811HS, available from du Pont) were prepared and double-extruded by an extruder so as to be formed into a three-layered resin layer 21 shown in FIG. 3. In FIG. 3, 21a is an EVOH layer (50μ thick) and 21b is a polyamide resin layer (80μ thick). Next, conventional adhesive was applied onto both sides of the resin layer 21, and each rubber composition shown in Tables 3 and 4 for forming the rubber layer 22 adjacent to the gas chamber 3 and the rubber layer 23 adjacent to the oil chamber 4 were press-formed by a presser and cured to be adhered together. Thus, the desired diaphragm was produced (see FIG. 2) In addition, the rubber layer 22 adjacent to the gas chamber 3 was 1.5 mm thick and the rubber layer 23 adjacent to the oil chamber 4 was 1.5 mm thick.

COMPARATIVE EXAMPLES 1 TO 6

The rubber compositions 7 to 9, which do not include EPDM, were used for forming the rubber layer 22 adjacent to the gas chamber 3, as shown in Table 5. Except for that, diaphragms were prepared in the same way as in Example 1.

A durability test was carried out using the thus obtained diaphragms of the Examples and the Comparative Examples at room temperature and a low temperature (−30° C.) in accordance with the following standard. The results are shown in Tables 3 to 5.

Operating Durability Test

Figures 5A, 5B:
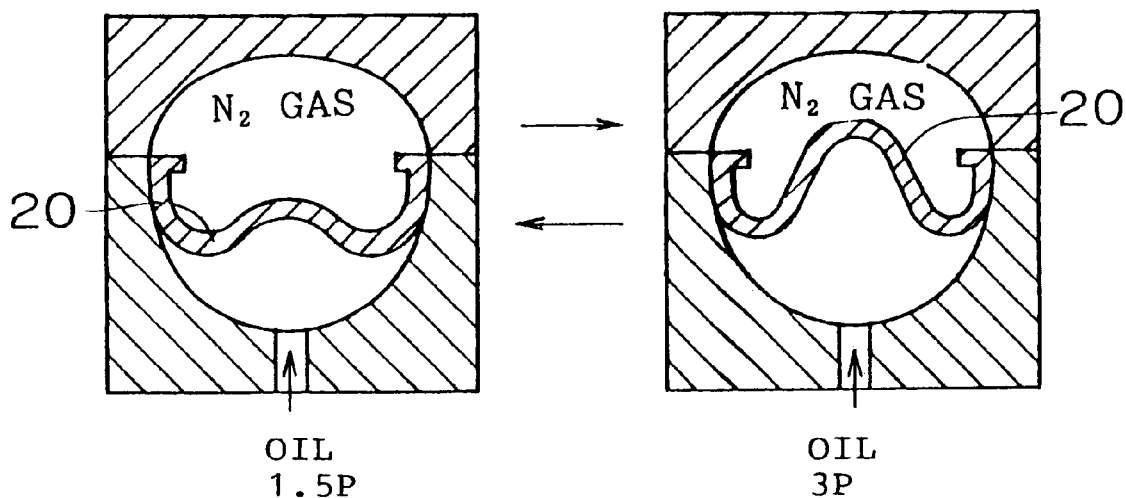
FIG. 5(A) and FIG. 5(B) are explanatory views of flex cracking tests of the diaphragm.

As an operating durability set, each diaphragm was placed in a flex cracking tester and changed alternately into the positions (A) and (B) respectively shown in FIG. 5(A) and FIG. 5(B). In the test, $N_2$ gas was employed as a sealing gas and the positions shown in FIGS. 5(A) and FIG. 5(B) were caused by changing the oil pressure in a range of 1.5 to 3 times of an initial sealing pressure (PO). In addition, the test conditions were conducted in two manners; one where the positions (A) and (B) alternatively were caused 1,000,000 times at room temperature and the other where the positions (A) and (B) alternatively were caused 30,000 times at a low temperature (−30° C.).

TABLE 3

| | EXAMPLES | | | | | |
|---|---|---|---|---|---|---|
| | 1 | 2 | 3 | 4 | 5 | 6 |
| Rubber layer adjacent to Gas chamber | Rubber composition 1 | Rubber composition 1 | Rubber composition 5 | Rubber composition 6 | Rubber composition 2 | Rubber composition 3 |
| Rubber layer adjacent to Oil Chamber | Rubber composition 1 | Rubber composition 7 | Rubber composition 7 | Rubber composition 7 | Rubber composition 7 | Rubber composition 8 |
| Operating durability (room temperature) 1.5 PO ⟺ 3 PO × 1,000,000 times | No abnormality | No abnormality | Small abrasion caused on rubber layer adjacent to Gas chamber | Small abrasion caused on rubber layer adjacent to Gas chamber | No abnormality | No abnormality |
| Operating durability (−30° C.) 1.5 PO ⟺ 3 PO × 30,000 times | No abnormality | No abnormality | No abnormality | No abnormality | No abnormality | No abnormality |

Note: PO means an initial sealing pressure.

TABLE 4

| | EXAMPLES | | | | |
|---|---|---|---|---|---|
| | 7 | 8 | 9 | 10 | 11 |
| Rubber layer adjacent to | Rubber composition 4 | Rubber composition 10 | Rubber composition 1 | Rubber composition 1 | Rubber composition 2 |

TABLE 4-continued

| | EXAMPLES | | | | |
|---|---|---|---|---|---|
| | 7 | 8 | 9 | 10 | 11 |
| Gas chamber Rubber layer adjacent to Oil Chamber | Rubber composition 9 | Rubber composition 8 | Rubber composition 8 | Rubber composition 9 | Rubber composition 9 |
| Operating durability (room temperature) 1.5 PO ⇔ 3 PO × 1,000,000 times | Small abrasion caused on rubber layer adjacent to Gas chamber | No abnormality | No abnormality | No abnormality | No abnormality |
| Operating durability (−30° C.) 1.5 PO ⇔ 3 PO × 30,000 times | No abnormality | No abnormality | No abnormality | No abnormality | No abnormality |

Note: PO means an initial sealing pressure.

TABLE 5

| | COMPARATIVE EXAMPLES | | | | | |
|---|---|---|---|---|---|---|
| | 1 | 2 | 3 | 4 | 5 | 6 |
| Rubber layer adjacent to | Rubber composition 7 | Rubber composition 8 | Rubber composition 9 | Rubber composition 7 | Rubber composition 8 | Rubber composition 9 |
| Rubber layer adjacent to | Rubber composition 7 | Rubber composition 8 | Rubber composition 9 | Rubber composition 1 | Rubber composition 2 | Rubber composition 3 |
| Operating durability (room temperature) 1.5 PO ⇔ 3 PO × 1,000,000 times | Large abrasion caused on rubber layer adjacent to Gas chamber | Large abrasion caused on rubber layer adjacent to Gas chamber | Large abrasion caused on rubber layer adjacent to Gas chamber | Large abrasion caused on rubber layer adjacent to Gas chamber | Large abrasion caused on rubber layer adjacent to Gas chamber | Large abrasion caused on rubber layer adjacent to Gas chamber |
| Operating durability (−30° C.) 1.5 PO ⇔ 3 PO × 30,000 times | Crack caused on rubber layer adjacent to Gas chamber | No abnormality | Crack caused on rubber layer adjacent to Gas chamber | Crack caused on rubber layer adjacent to Gas chamber | No abnormality | Crack caused on rubber layer adjacent to Gas chamber |

Note: PO means an initial sealing pressure.

According to the results of Tables 3 to 5, in the case of using the diaphragms of the EXAMPLES, there was no abnormality caused both at room temperature and at a low temperature. In some EXAMPLES, there was small abrasion, which is no problem for use of the diaphragm in the accumulator. On the other hand in the case of using the diaphragms of the COMPARATIVE EXAMPLES, large abrasion and a crack were caused on the rubber layer to be adjacent to the gas chamber 3 both at room temperature and a low temperature.

Figure 6:
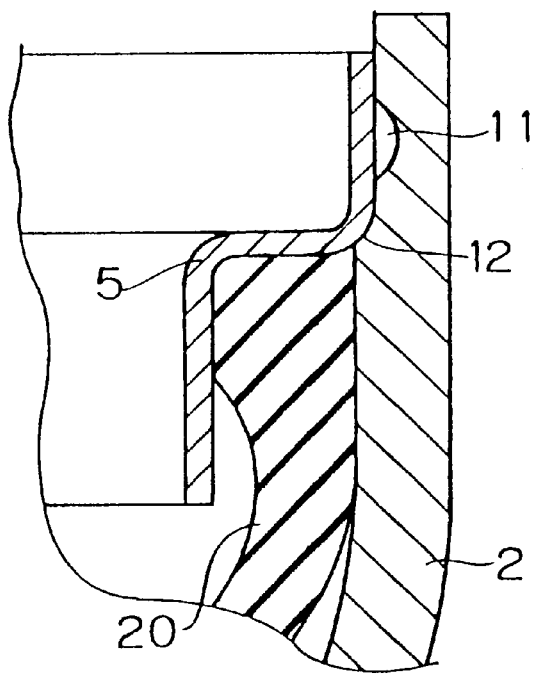
FIG. 6 is a sectional view of the essential portion of an accumulator shown in FIG. 1 before a ring holder caulks the lower split-shell.
Figure 7:
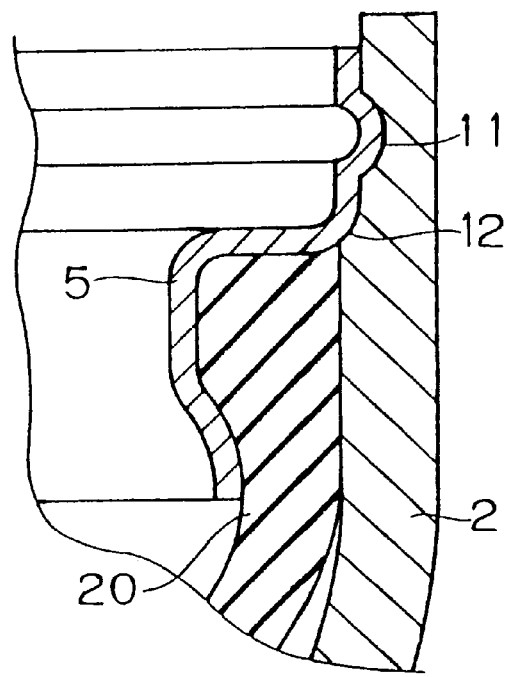
FIG. 7 is a sectional view of the essential portion of the accumulator shown in FIG. 1 after the ring holder caulks the lower split-shell.

Next, an accumulator was prepared in the following manner using the diaphragm of the EXAMPLES. As shown in FIG. 1, an upper shell 1 and a lower shell 2 were prepared as a pairs of split-shells and the diaphragm 20 was formed in such a manner that its periphery was thick. The diaphragm 20 was fixed in an inner circumferential edge of the opening of a lower shell 2 using a ring holder 5 as shown in figures. In this case, as shown in FIG. 6, a groove 11 is preliminary formed in a circumferential direction on inner circumferential surface of the opening of the lower shell 2 and a stepped portion 12 is formed under the groove 11. The ring holder 5 has a stepped structure, wherein an upper part thereof has a large diameter and a lower part thereof has a small diameter. The upper part of the ring holder 5 was positioned onto the inner circumferential surface of the opening of the lower shell 2, the stepped portion 12 was positioned onto a distal end of thick part of the diaphragm 20, and the lower part was positioned onto the thick part of diaphragm 20. Then, the ring holder 5 was caulked by a caulking tool (not shown) as shown in FIG. 7. Thereby, an inner circumferential thick part of the diaphragm was pinched by the lower outer periphery of the ring holder 5 and the inner circumferential surface of the opening of the lower shell 2. The center of the upper part of the ring holder 5 is forced to bite into the groove 11 formed in a circumferential direction on the inner surface of the opening of the lower shell 2. For this reason, a fixative degree of the ring holder 5 is improved and a sealing degree between the ring holder 5 and the lower shell 2 is also improved. Accordingly, permeation and leak are of gas and oil between the lower shell 2 and the ring holder 5 can be prevented. In addition, the ring holder 5 may not slip by the step 12 provided in the inner surface of the opening of the lower shell 2, so that positioning accuracy of the ring holder 5 can be improved. Thus, the diaphragm 20 is installed onto the lower shell 2 and the opening of the upper shell 1 is engaged onto the opening of the lower shell 2, so that a generally spherical shell as a whole is formed. In this case, the position where the diaphragm 20 is installed can be checked visually before installing the upper shell 1, which makes it possible to prevent poor installation of the diaphragm 20. A joint portion between the opening of the upper split-shell 1 and the opening of the lower split-shell 2 is welded by electron beam and the like. Thereby, the dissolved part can be narrowed, resulting in a decrease or prevention of a thermal effect on the thick portion on the periphery of the diaphragm 20. In this manner, the accumulator as shown in FIG. 1 was prepared. In the accumulator, the internal space defined by the split-shells 1,2 is separated by the diaphragm 20 into the gas chamber 3 and the oil chamber 4.

The thus obtained accumulator has superior durability and a long service life.

EFFECT OF THE INVENTION

As mentioned above, since the diaphragm of the present invention employs a mixture of butyl rubber and EPDM for forming the rubber layer adjacent to the gas chamber 3, operation both at room temperature and at a low temperature is improved compared with a conventional diaphragm using solely butyl rubber, so that superior durability can be realized. Accordingly, the accumulator using the diaphragm of the present invention has a prolonged service life.

In addition, in the case that a plurality of grooves each having a concave cross section and extending in the circumferential direction, are formed on the surface of the rubber layer adjacent to the gas chamber 3, the durability of the diaphragm and the accumulator using the same is further improved.

What is claimed is:

1. A diaphragm comprising:
   a resin layer for gas shielding;
   a rubber layer adapted to be adjacent to a gas chamber, and a rubber layer adapted to be adjacent to an oil chamber, the rubber layers formed on opposite sides of the resin layer;
   wherein the rubber layer adapted to be adjacent to the gas chamber is formed of a mixture of butyl rubber and ethylene-propylene-diene terpolymer.

2. A diaphragm as set forth in claim 1, wherein a plurality of grooves, each having a concave cross section and extending in the circumferential direction, are formed on a surface of the rubber layer adjacent to the gas chamber.

3. An accumulator comprising:
   a shell; and
   a diaphragm which separates an internal space of the shell into a gas chamber and an oil chamber;
   wherein the diaphragm comprises:
      a resin layer for gas shielding;
      a rubber layer adjacent to a gas chamber, and a rubber layer to an oil chamber, the rubber layers formed on opposite sides of the resin layer;
      wherein the rubber layer adjacent to the gas chamber is formed of a mixture of butyl rubber and ethylene-propylene-diene terpolymer.

4. An accumulator as set forth in claim 3, wherein a plurality of grooves, each having a concave cross section and extending in the circumferential direction, are formed on a surface of the rubber layer adjacent to the gas chamber.

* * * * *